(12) United States Patent
Chen et al.

(10) Patent No.: US 9,024,791 B2
(45) Date of Patent: May 5, 2015

(54) INPUT DEVICE WITH ROTARY WHEEL

(75) Inventors: Koh Siang Chen, Singapore (SG); Al Tee Ang, Singapore (SG)

(73) Assignee: Koninklijke Philips N.V., Eindhoven (NL)

( * ) Notice: Subject to any disclaimer, the term of this patent is extended or adjusted under 35 U.S.C. 154(b) by 819 days.

(21) Appl. No.: 13/060,294

(22) PCT Filed: Aug. 24, 2009

(86) PCT No.: PCT/IB2009/053714
§ 371 (c)(1),
(2), (4) Date: Feb. 23, 2011

(87) PCT Pub. No.: WO2010/026507
PCT Pub. Date: Mar. 11, 2010

(65) Prior Publication Data
US 2011/0156931 A1    Jun. 30, 2011

(30) Foreign Application Priority Data

Sep. 2, 2008  (EP) .................................... 08163499

(51) Int. Cl.
| | | |
|---|---|---|
| H03K 17/94 | (2006.01) | |
| H03M 11/00 | (2006.01) | |
| G06F 3/033 | (2013.01) | |
| G09G 5/08 | (2006.01) | |
| G06F 3/0362 | (2013.01) | |

(52) U.S. Cl.
CPC .................................. *G06F 3/0362* (2013.01)

(58) Field of Classification Search
CPC .... G06F 3/0362; G06F 3/0312; G06F 3/0338
USPC ........... 345/156–178; 341/35; 348/14.05, 734
See application file for complete search history.

(56) References Cited

U.S. PATENT DOCUMENTS

| | | | | |
|---|---|---|---|---|
| 4,476,357 | A | * | 10/1984 | Malmborg et al. ........ 200/51.09 |
| 5,508,703 | A | * | 4/1996 | Okamura et al. ............. 341/176 |
| 7,741,938 | B2 | * | 6/2010 | Kramlich ........................ 335/77 |
| 2002/0093490 | A1 | | 7/2002 | Lee |
| 2004/0046738 | A1 | * | 3/2004 | Wang ............................ 345/157 |
| 2005/0231463 | A1 | | 10/2005 | Yang |
| 2006/0195801 | A1 | | 8/2006 | Iwamura |
| 2007/0247421 | A1 | | 10/2007 | Orsley et al. |
| 2007/0264743 | A1 | | 11/2007 | Vaganov |
| 2008/0058022 | A1 | * | 3/2008 | Ahn .............................. 455/566 |
| 2008/0224996 | A1 | * | 9/2008 | Arihara et al. ................ 345/157 |
| 2011/0261520 | A1 | | 10/2011 | Washizu et al. |

FOREIGN PATENT DOCUMENTS

| | | | |
|---|---|---|---|
| CN | 101784977 A | | 7/2010 |
| EP | 1724662 A2 | | 11/2006 |
| EP | 1840710 A2 | | 10/2007 |
| EP | 1936648 | * | 6/2008 |
| WO | 2005019987 A2 | | 3/2005 |
| WO | 2006128731 A1 | | 12/2006 |

\* cited by examiner

*Primary Examiner* — Firmin Backer
*Assistant Examiner* — Jerold Murphy

(57) ABSTRACT

An input device for an electronic apparatus including a printed circuit board with an opening in which a rotary wheel module is mounted. The construction enables the input device to be thinner.

16 Claims, 4 Drawing Sheets

INPUT DEVICE WITH ROTARY WHEEL

The invention relates to an input device with a rotary wheel for an electronic apparatus, particularly for a remote-control. Moreover, it relates to an electronic apparatus with such an input device.

An input device with a rotary wheel that is used e.g. for scrolling operations is described in the US 2007 0247421 A1. The wheel of this device is mounted on a printed circuit board (PCB) and extends through a hole in the casing of the electronic device. Rotation of the wheel is transformed into electrical signals by capacitive sensors.

Based on this situation it was an object of the present invention to provide input means for an electronic apparatus that can be realized with a small thickness preferably of less than 10 mm, most preferably less than 5 mm.

This object is achieved by an input device according to claim 1 and an electronic apparatus according to claim 15. Preferred embodiments are disclosed in the dependent claims.

The input device of the present invention is intended for an application in an electronic apparatus, for example in a remote-control that can be attached to the card slot of a portable computer. The input device comprises the following components:

A printed circuit board having two opposite sides, which will be called "top side" and "bottom side" in the following for purposes of reference, and an opening. The opening may be an inner opening that is completely surrounded by material of the printed circuit board, or it may be a bay-shaped opening that is connected to the outside.

A "rotary wheel module" that is mounted in the aforementioned opening of the printed circuit board and that has a rotary wheel which extends above the top side of the printed circuit board. The rotary wheel constitutes a component that can be touched and operated by a user, wherein the operation usually comprises a rotation of the rotary wheel about a central axis.

A signal generator for generating electrical signals corresponding to an operation of the rotary wheel, wherein said signal generator is (electrically and/or mechanically) connected to the printed circuit board. The signal generator may for example comprise a switch that closes or opens an electrical circuit, and it is preferably connected to the bottom side of the printed circuit board.

The described input device has the advantage that it can be made extremely thin because the rotary wheel module is integrated into the opening of a printed circuit board. Thus the printed circuit board, which may comprise usual electronic components for the processing (amplification, conversion, evaluation etc.) of the signals generated by the signal generator, and the rotary wheel module can be placed in the same layer. In comparison to usual designs, in which these components are stacked onto each other, about half of the height is required. In practice, input devices with a thickness of less than 5 mm can be realized in this way.

The rotary wheel module may preferably comprise an undercarriage on which the rotary wheel is rotatably mounted. This can for example be achieved by mounting the rotary wheel onto an axis of the undercarriage, preferably with some snap-in mechanism for preventing an unintended separation of the rotary wheel from the undercarriage.

The aforementioned undercarriage may preferably comprise at least one adjustment pin that is suited for placement in a corresponding hole of the printed circuit board. In this way the undercarriage can readily be mounted at a definite position relative to the printed circuit board, thus guaranteeing that the rotary wheel module will have enough clearance and not get stuck in the opening.

Preferably the above undercarriage is mechanically attached to the printed circuit board, most preferably to the bottom side of this board. Thus a rigid connection between the printed circuit board and the rotary wheel module can be established.

In general, the signal generator may apply any suitable means or principle to convert input operations at the rotary wheel module into electrical signals. This may for example comprises an optical, magnetic, capacitive, conductive, or inductive sensing of motions of the rotary wheel. In a preferred embodiment, the signal generator comprises a lever switch with a lever that can be actuated by teeth of the rotary wheel. The use of a mechanical lever switch has the advantage that it is not necessary to continuously provide power to the signal generator for enabling it to generate signals. This allows to minimize the power consumption of the input device.

The aforementioned lever switch is preferably attached to the bottom side of the printed circuit board, thus optimally distributing the components of the input device in the available small space. Moreover, there is no danger that teeth of the rotary wheel which actuate the lever switch could touch the printed circuit board during a rocking motion of the rotary wheel.

Besides the rotary wheel, the input device may comprise further input elements, particularly a button that is mounted on an undercarriage. Most preferably, said button is mounted on the same undercarriage as the rotary wheel in the design described above. The button can for example be used to confirm selections a user has made in a list by depressing it.

In a further development of the aforementioned embodiment, the button is non-rotatably mounted in a center opening of the rotary wheel. Thus it can readily be reached by the same finger that operates the rotary wheel. Moreover, the button will not take part in a rotation of the rotary wheel, which prevents that symbols printed onto the button will change their orientation relative to the input device.

According to a further development of the invention, the rotary wheel module comprises a circuit layer with at least one electrical switch that can be operated by the rotary wheel and/or by a button. The movement of the rotary wheel that operates this switch is preferably different from a rotation and may for example comprise a downward movement of the whole wheel or an edge of it (when the wheel is pressed at a peripheral position).

The aforementioned circuit layer may optionally comprise at least one metal dome for realizing an electrical switch with a very compact design. Metal domes (or "metal snap domes", "tactile metal domes") are momentary switch contacts that, when used in conjunction with a printed circuit board, flex circuit, or membrane, become normally-open tactile switches. Metal domes are typically made of stainless steel.

The circuit layer is preferably realized by a flexible circuit board, for example a flexible substrate with conductive tracks on its surface. Thus the thickness of the circuit layer can be minimized.

According to a preferred embodiment, the circuit layer is connected to a connector which is attached to the bottom side of the printed circuit board. Thus it is possible to realize a reversible plug-in connection between the circuit layer and the printed circuit board. Moreover, the electrical connection allows to use the readout, signal processing, and data output components on the printed circuit board.

The input device may further comprise a housing element, wherein the rotary wheel module is sandwiched between the printed circuit board and said housing element. Thus a stable arrangement can be achieved without the need to permanently attach the rotary wheel module to the printed circuit board.

It was already mentioned that the printed circuit board usually comprises some circuitry for processing signals generated by the signal generator. Preferably, this circuitry can assume a sleep-mode with a reduced (or switched-off) power consumption, wherein this sleep-mode is left upon operation of the rotary wheel module. If the rotary wheel module has switches that are normally open and only closed during operation of the rotary wheel module, the power consumption can even be reduced to zero or nearly zero.

The invention further relates to an electronic apparatus comprising an input device of the kind described above. The electronic apparatus may particularly be a remote-control, a portable computer, a mobile phone, a music player, a game device, a digital camera, or a card for a card slot.

These and other aspects of the invention will be apparent from and elucidated with reference to the embodiment(s) described hereinafter. These embodiments will be described by way of example with the help of the accompanying drawings in which.

Like reference numbers in the Figures refer to identical or similar components. Moreover, all Figures but FIG. 6 show perspective views.

Figure 1:
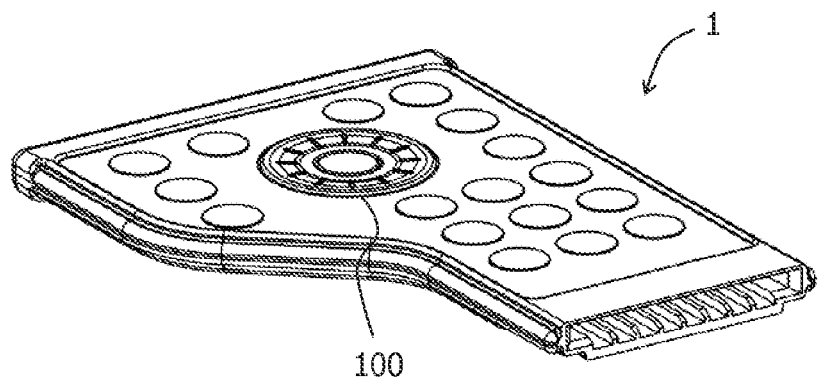
FIG. 1 shows an input device according to the present invention in its completely assembled state.

The embodiment of the input device 1 illustrated in the Figures can be used as a remote control that is attachable to the slot of a portable computer (not shown). FIG. 1 shows the input device 1 in its completely assembled state. Due to its particular design, the input device has a thickness of only about 4.9 mm. The main design features of the input device 1, which will be explained in more detail below, comprise:

A rotary wheel module that is located within a slot or opening of a printed circuit board (PCB).

An undercarriage of the rotary wheel module is glued onto a smaller circuit layer or "sub-PCB".

Metal domes are mounted on the smaller sub-PCB.

The sub-PCB is connected via a connector to the PCB.

The rotary wheel module as a whole is locked in position as a sandwich between a bottom plastic part and the PCB.

A lever switch is disposed on the bottom side of the PCB and actuated by teeth of a rotating wheel.

The rotary wheel module has an additional "OK" button.

Figure 2:
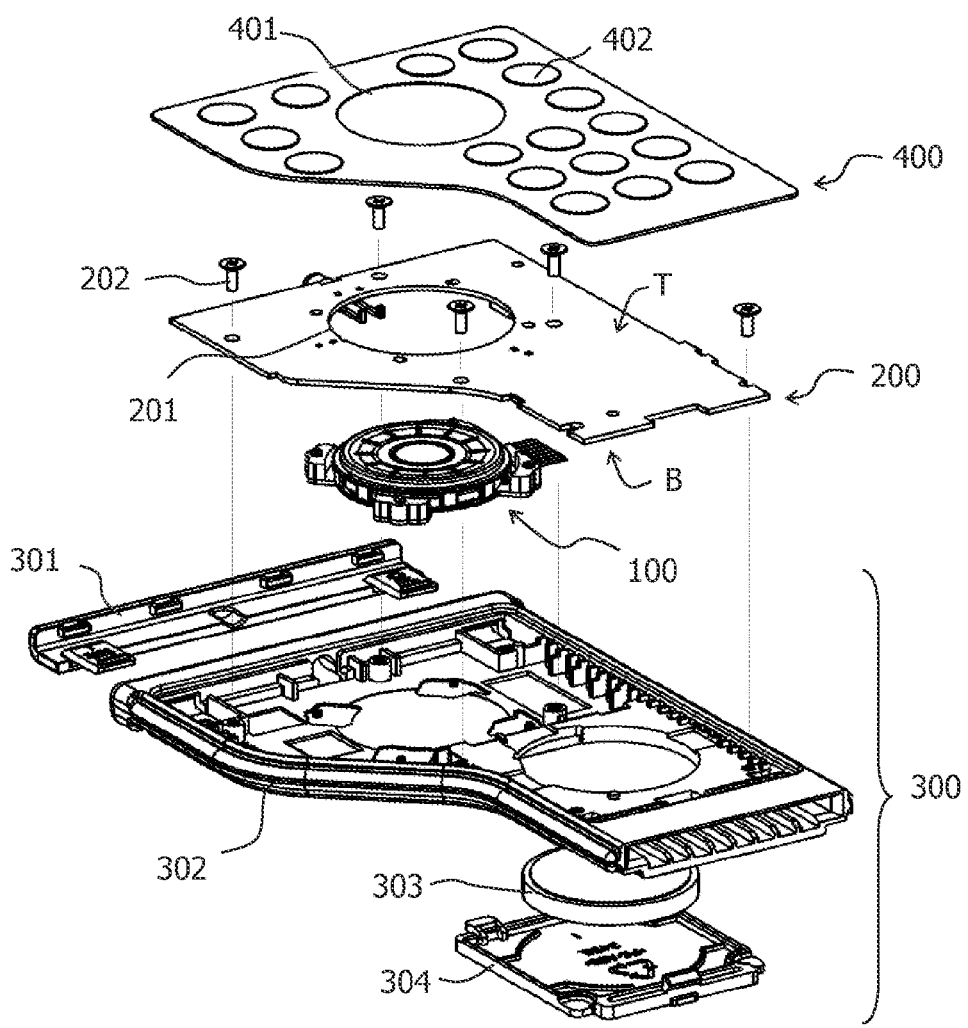
FIG. 2 shows an exploded view of the input device.

FIG. 2 shows the input device 1 in an exploded view. The following components (from bottom to top) can the recognized:

A bottom part 300 with a housing element 302 (e.g. an injection molded part), a transparent infrared window 301, and a battery lid 304 for keeping a coin cell battery 303 in the housing element 302.

A rotary wheel module 100 which will be described in more detail below.

A printed circuit board 200 (PCB) with signal processing circuits and an IR LED for a wireless communication. Moreover, the PCB 200 has a circular opening 201 in which the rotary wheel module 100 is mounted. It is fixed by screws 202 to the housing 302. The surface of the PCB 200 that is visible in the Figure will be called "top side" T in the following, while the opposite surface is the "bottom side" B.

A cover element 400 with a circular opening 401 for the rotary wheel module 100 and with domes 402 serving as input keys. The cover element 400 may particularly be a plastic part with symbols and/or text printed on it.

Figure 3:
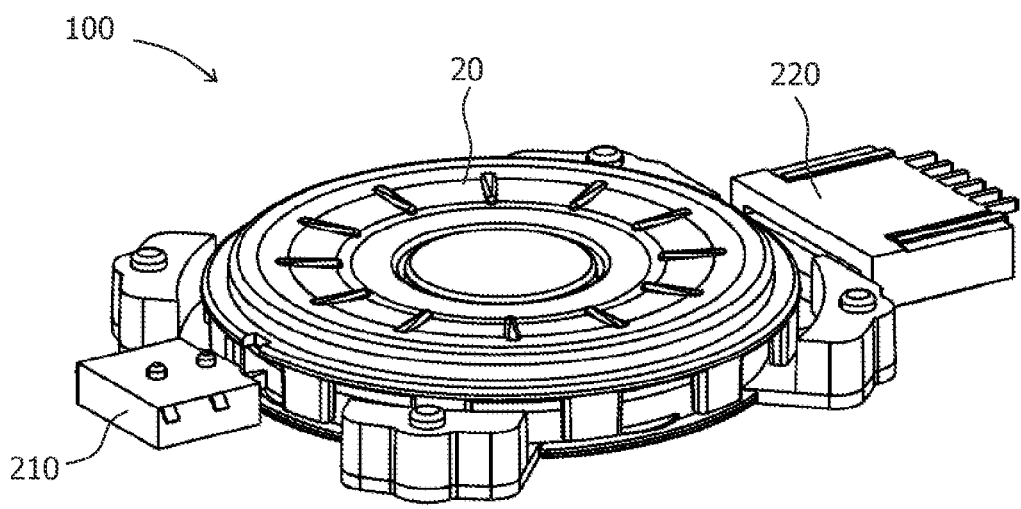
FIG. 3 shows the rotary wheel module of the input device in its assembled state.

FIG. 3 shows the mentioned rotary wheel module 100 separately in its assembled state together with a lever switch 210 and a flex connector 220.

Figure 4:
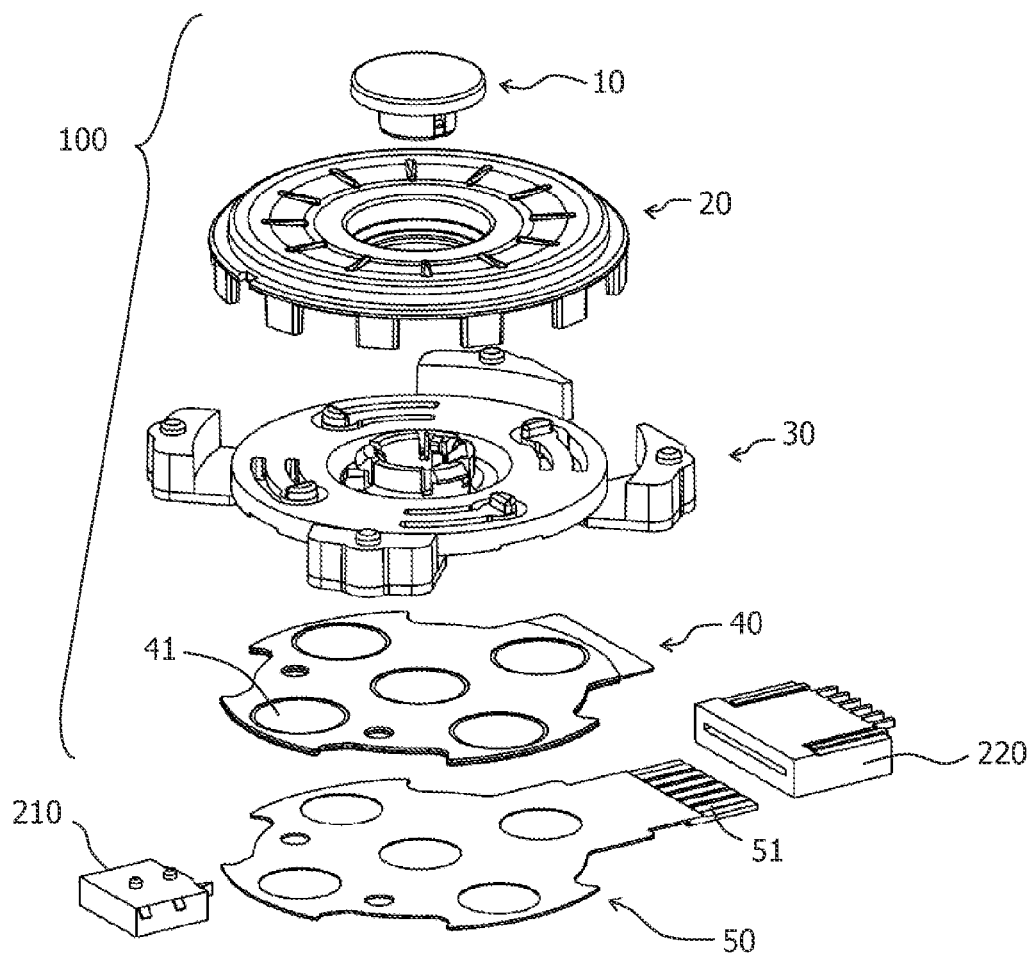
FIG. 4 shows an exploded view of the rotary wheel module.

FIG. 4 shows the above components in an exploded view. The following components of the rotary wheel module 100 can be recognized:

A press button 10 located in a central opening of a rotary wheel 20.

An undercarriage 30 on which the rotary wheel 20 and the button 10 are mounted.

A metal dome assembly 40 with five metal domes 41.

A circuit layer realized by a flex circuit 50 ("sub-PCB") with a stripe 51 of conductive tracks that can be plugged into the connector 220. The flex circuit 50 comprises the circuit footprint for the metal dome actuation. In the assembled state, it adheres to the metal dome assembly 40, which in turn adheres to the undercarriage 30. Using a flex circuit has the advantage that these components are usually very thin.

Figure 5:
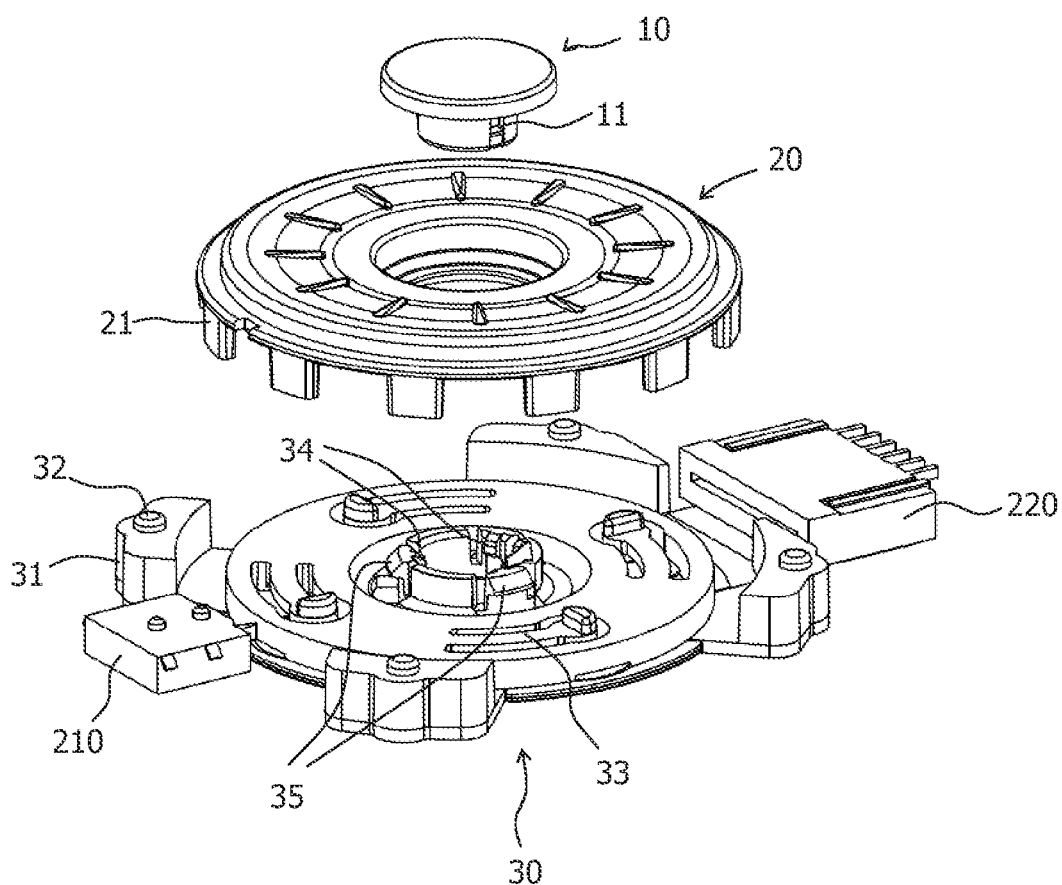
FIG. 5 shows an exploded view of the rotary wheel module in a partially assembled state.

FIG. 5 shows another view of the rotary wheel module 100 in which the flex circuit 50, the metal dome assembly 40, and the undercarriage 30 have been glued together. It can be seen that the undercarriage 30 comprises four arms 31 in a cross-shaped arrangement with adjustment pins 32 on their top. The adjustment pins 32 can be put into corresponding holes or bores of the PCB 200 to provide a definite positioning of the rotary wheel module 100 relative to said board.

FIG. 5 further shows four tongues or plungers 33 equally distributed on an annular body of the undercarriage 30. The tips of the plungers 33 are cut free from the material of the annular body and located above the four outer metal domes 41 of the metal dome assembly 40 (FIG. 4). Depressing a plunger 33 will therefore actuate an associated metal dome and the flex circuit 50, thus generating corresponding electrical signals.

The rotary wheel 20 is free to rotate in either direction about its centre. If a user presses the rotary wheel 20 at a peripheral position, the resulting tilting or rocking movement causes the plunger 33 underneath said position to depress, which results in the described metal dome actuation. The contact between the metal domes 41 and the plungers 33 and between the plungers and the rotary wheel 20 stabilizes the rotary wheel 20 when it is stationary and during its rotation.

The centre of the undercarriage 30 comprises inner catches 34 that engage with recesses 11 of the button 10, thus coupling it to the undercarriage. Due to a rib structure of the button 10, the button is prevented from rotating. Any text printed onto it will therefore keep its orientation and not take part in a rotation of the rotary wheel 20. The press button 10 rests on the central metal dome of the metal dome assembly 40 and is free to travel a little distance downwards which is sufficient to actuate said metal dome.

The centre of the undercarriage 30 further comprises outer catches 35 that engage with corresponding grooves of the rotary wheel 20, thus coupling it by a snap-in mechanism to the undercarriage 30 in such a way that it is free to rotate in either direction about its centre.

Figure 6:
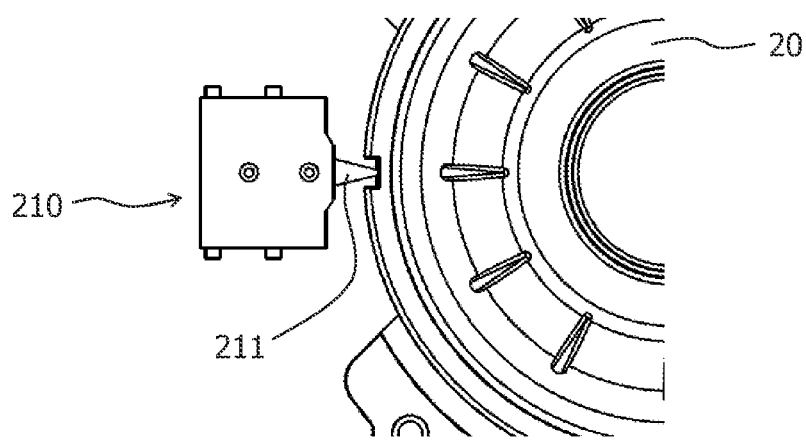
FIG. 6 shows a top view onto the lever switch of the input device.

When the rotary wheel 20 is rotated by a user, its multiple teeth 21 deflect the lever 211 of the lever switch 210 either to the "left" or to the "right", which generates corresponding electrical signals. The interaction between the rotary wheel 20 and the lever 211 is shown in more detail in the top view of FIG. 6.

Figure 7:
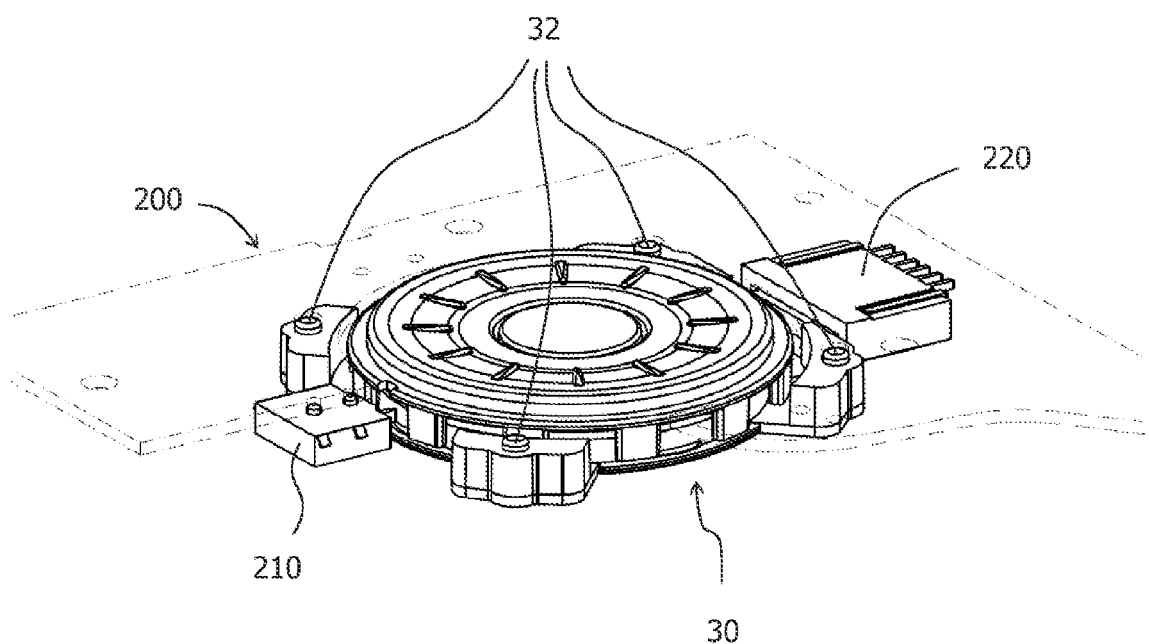
FIG. 7 shows the rotary wheel module mounted to the printed circuit board.

FIG. 7 illustrates the attachment of the rotary wheel module 100 to the printed circuit board 200, wherein the latter is partially sectioned to make the wheel module better visible. It can be seen that the adjustment pins 32 on the arms 31 of the undercarriage 30 engage with bores on the bottom side of the PCB 200. The lever switch 210 is soldered to the bottom side of the PCB, thus connecting it electrically and fixing it mechanically. Similarly, the connector 220 is soldered to the bottom side of the PCB for a mechanical and electrical connection.

The placement of the rotary wheel module 100 in an opening 201 of the PCB 200 has the advantage to allow for an extremely thin design. Moreover, it provides for a reliable wheel operation as the teeth 21 of the rotary wheel 20 can be made long enough to securely engage the lever 211 of the lever switch 210, even if the rotary wheel is tilted by a pressing actuation of a user. In the latter case, there is no danger that the (long) teeth 21 might interfere with electronic components, as would be the case if the rotary wheel module would be mounted on a printed circuit board.

The use of the mechanical lever switch 210 has advantages with respect to battery lifetime. Due to its mechanical design, the lever 211 of switch 210 is always ready to be operated and to turn on corresponding read-out circuitry. This allows the circuitry to assume a sleep-mode that avoids unnecessary draining of the battery. In contrast to this, input devices based on optical, magnetic, capacitive or other electronic sensing mechanisms will require a continuous power supply.

A further advantage of the input device is that it can be produced in a very cost-effective way as its parts are thin and can be made from normal plastics. Moreover, standard off-the-shelf products can be used for components like the lever switch and the flex connector.

In summary, the invention proposes a scroll wheel design for thin products with a rotating wheel system for scrolling control and navigation cursor control, the latter for example consisting of an up, down, left, right and centre actuation. In the described particular embodiment, the wheel mounts onto and rotates about an undercarriage support. The wheel has multiple teeth which, during rotation, brush and deflect a switch lever, and thereby activate the signals for scrolling. Moreover, the undercarriage has plungers which stabilize the wheel. When the wheel is pressed in its up, down, left or right directions, the plungers in turn deflect and actuate metal domes beneath. This activates the signals for cursor control. The undercarriage can also have a centre portion to mount a centre key, which can travel a sufficient vertical distance to actuate a fifth metal dome beneath, which activates the signal as a confirmation or so-called "ok" key.

Both the switch lever and metal domes are mounted onto PCBs and provide the means to convert a user's finger/thumb movements into electrical signals. The input device can particularly be used in connection with PCMCIA or express card remote-control products.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An input device for an electronic apparatus, comprising:
   a printed circuit board with a top side, a bottom side, and an opening;
   a rotary wheel module that is mounted in the opening and that has a rotary wheel located above the top side of the printed circuit board and at least one actuator structurally extending from the rotary wheel to the bottom side of the printed circuit board to couple mechanical manipulation of the rotary wheel to produce a mechanical manipulation on the bottom side of the printed circuit board; and
   a signal generator configured to generate electrical signals corresponding to the coupled mechanical manipulation of the rotary wheel including mechanical actuation on the bottom side of the printed circuit board by the coupled mechanical manipulation of the rotary wheel, said signal generator being connected to the bottom side of the printed circuit board.

2. The input device according to claim 1, wherein the rotary wheel module comprises an undercarriage to which the rotary wheel is rotatably mounted.

3. The input device according to claim 2, wherein the undercarriage comprises at least one adjustment pin for placement in a corresponding hole of the printed circuit board.

4. The input device according to claim 2, wherein the undercarriage is attached to the bottom side of the printed circuit board.

5. The input device according to claim 1, wherein the at least one actuator comprise teeth that mechanically couples the operation of the rotary wheel to the bottom side of the printed circuit board and the signal generator comprises a lever switch with a lever that can be actuated by the teeth.

6. The input device according to claim 5, wherein the lever switch is attached to the bottom side of the printed circuit board.

7. The input device according to claim 1, comprising a button that is mounted on an undercarriage.

8. The input device according to claim 7, wherein the button is non-rotatably mounted in a central opening of the rotary wheel.

9. The input device according to claim 1, wherein the rotary wheel module comprises a circuit layer with at least one switch that can be operated by at least one of the rotary wheel and a button.

10. The input device according to claim 9, wherein the circuit layer comprises at least one metal dome.

11. The input device according to claim 9, wherein the circuit layer comprises a flexible circuit board.

12. The input device according to claim 9, wherein the circuit layer is connected to a connector that is attached to the bottom side of the printed circuit board.

13. The input device according to claim 1, comprising a housing element, wherein a portion of the rotary wheel module is sandwiched between the printed circuit board and said housing element.

14. The input device according to claim 1, wherein circuitry on the printed circuit board is configured to assume a sleep-mode that is left upon manipulation of the rotary wheel module.

15. An electronic apparatus comprising an input device according to claim 1, wherein the apparatus is one of a remote-control, a portable computer, a mobile phone, a music player, a game device, a digital camera, or a card for a card slot.

16. An input device for an electronic apparatus, comprising:
- a printed circuit board with a top side, a bottom side, and an opening;
- a connector attached to the bottom side of the printed circuit board;
- a rotary wheel module that is mounted in the opening and that has a rotary wheel located above the top side of the printed circuit board and at least one actuator structurally extending from the rotary wheel to the bottom side of the printed circuit board to couple mechanical manipulation of the rotary wheel to the bottom side of the printed circuit board, wherein the rotary wheel module comprises a circuit layer with at least one switch that can be operated by at least one of the rotary wheel and a button, wherein the circuit layer is connected to the connector;
- a signal generator configured to generate electrical signals corresponding to the coupled mechanical manipulation of the rotary wheel including mechanical actuation on the bottom side of the printed circuit board by the coupled mechanical manipulation of the rotary wheel, said signal generator being connected to the printed circuit board.

* * * * *